(12) United States Patent
Malone

(10) Patent No.: US 6,335,840 B1
(45) Date of Patent: Jan. 1, 2002

(54) THERMAL ASPERITY POINTER FOR SERVO SECTOR

(75) Inventor: Daniel James Malone, San Jose, CA (US)

(73) Assignee: International Business Machine Corporation, Armonk, NY (US)

( * ) Notice: Subject to any disclaimer, the term of this patent is extended or adjusted under 35 U.S.C. 154(b) by 0 days.

(21) Appl. No.: 09/188,836

(22) Filed: Nov. 9, 1998

(51) Int. Cl.$^7$ ................................................ G11B 5/02
(52) U.S. Cl. .......................................... 360/25; 360/53
(58) Field of Search ............................. 360/25, 46, 53, 360/77.02, 78.04

(56) References Cited

U.S. PATENT DOCUMENTS

| | | | |
|---|---|---|---|
| 5,233,482 A | 8/1993 | Galbraith et al. | 360/46 |
| 5,497,111 A | 3/1996 | Cummingham | 327/58 |
| 5,527,110 A | 6/1996 | Abraham et al. | 374/5 |
| 5,559,460 A | 9/1996 | Cunningham | 327/179 |
| 5,666,237 A | 9/1997 | Lewis | 360/75 |
| 5,696,643 A | 12/1997 | Tsuwako et al. | 360/73.03 |
| 5,701,314 A | 12/1997 | Armstrong et al. | 371/40.3 |
| 5,898,535 A * | 4/1999 | Kawai | 360/77.02 |

FOREIGN PATENT DOCUMENTS

JP 10-143804 * 5/1998

OTHER PUBLICATIONS

JP410188500A, english abstract, "Data Recording/Reproducing Device, and Seek, and Positioning Control Method For Head in the Same" (Page Numbers Not Available), Jul. 1998.*

JP410188248A, english abstract, "Servo Signal Processing Circuit and Magnetic Disk Device, Using It" single page (Page Numbers Not Available), Jul. 1998.*

* cited by examiner

Primary Examiner—Alan T. Faber
(74) Attorney, Agent, or Firm—Heller, Ehrman, White, & McCauliffe; Brian C. Kunzler

(57) ABSTRACT

A direct access storage device (DASD) servo control system controls movement of a magneto-resistive (MR) read/write head in response to a readback signal generated when the MR head repeatedly passes adjacent multiple servo fields and data fields of the recording medium. The servo control system receives multiple data samples, detects a thermal asperity in the readback signal when the MR transducer is adjacent a servo field of the recording medium, determines that the servo field data samples affected by the thermal asperity are invalid due to possible data errors, and operates a servo demodulator in response to the servo field thermal asperity before the MR transducer is next adjacent the servo field. In a DASD with a rotating disk, for example, the thermal asperity response can be implemented before one revolution of the disk has been completed after the thermal asperity is encountered. This permits data samples that have been corrupted by the thermal asperity to be ignored from servo processing, thereby reducing the uncertainty in the servo information being processed. If desired, the response can be implemented before the next servo sector is encountered. In this way, the DASD more effectively utilizes storage system resources and, in particular, handles thermal asperities more efficiently.

26 Claims, 5 Drawing Sheets

THERMAL ASPERITY POINTER FOR SERVO SECTOR

BACKGROUND OF THE INVENTION

1. Field of the Invention

This invention relates generally to direct access storage devices and, more particularly, to detection of errors in the readback signal of such devices.

2. Description of the Related Art

In a conventional computer data storage system having a rotating storage medium, such as a magnetic or magneto-optical disk, data is stored in a series of concentric or spiral tracks across the surface of the disk. A magnetic disk, for example, can comprise a disk substrate having a surface on which a magnetic material is deposited. The digital data stored on a disk comprises magnetic information that is represented as a series of variations in magnetic orientation of the disk magnetic material. The variations in magnetic orientation, generally comprising reversals of magnetic flux, represent binary digits of ones and zeroes that in turn represent data. The binary digits must be read from and recorded onto the disk surface. A read/write transducing head produces and detects variations in magnetic orientation of the magnetic material as the disk rotates relative to the head.

A computer data storage system may include multiple magnetic disks. The tracks of each disk may be partitioned by sectors having a short servo track information area followed by a user data area. The servo track information area typically includes a sector marker, track identification data, and a servo burst pattern, which are recorded at the time of disk manufacture. The sector marker indicates to the read/write transducing head that servo information immediately follows in the track. The user data area contains data recorded by an end user, or disk drive customer. The head used for reading servo data is typically the same head used for reading customer data.

The MR Head

A magneto-resistive (MR) transducing head includes an MR element that exhibits a change in resistance when in the presence of a changing magnetic field. The change in resistance of the MR element is transformed into a voltage signal by passing a constant bias current through the MR element. For a given MR head, the value of the voltage is the product of the constant bias current and the total resistance between the lead terminals of the head. In this way, the MR head generates a fluctuating voltage readback signal as the MR head is passed over the magnetic information recorded on the disk magnetic material. In a direct access data storage system using digital demodulation, the fluctuating readback signal is digitized and the digital data values of the sampled readback signal are processed to recover the recorded data.

A transient disturbance in the MR head readback signal can result from a thermal asperity, which occurs when a hard particle on the surface of the disk collides with the MR head. The collision causes a rapid temperature rise in the MR element that can be greater than 100 degrees Centigrade (100° C). The temperature increase first occurs at the point of contact between the particle and the MR element. The localized temperature increase produces a small but sudden increase in temperature of the entire MR head within 50 to 100 nanoseconds. The MR element has a temperature coefficient of resistance equal to approximately 0.02% per degree C, such that the resistance of the head can increase by several percentage points. This can result in a dramatic change in the voltage of the readback signal.

An MR head has voltage non-linearities that increase with increasing readback signal variations relative to the sensor bias current. As a result, MR heads are designed to maintain signal variations sufficiently small to ensure usable sensor linearity. Voltage variations due to thermal asperities can be many times the typical base-to-peak signal variation produced by the MR head. In addition to the high amplitude change in the readback signal, a thermal asperity also exhibits a relatively long decay time. The high amplitude change and long decay time of a thermal asperity severely disrupts the stream of data samples from the digitized readback signal.

A disk drive data storage system typically includes two signal paths for the readback signal, comprising a data channel and a servo channel. When the MR head is over a customer data field, the readback signal is processed by the data channel so the system can read and write customer data to and from the disk. When the MR head is over a servo field of the disk, the readback signal is processed by the servo channel to read the servo pattern information that is pre-recorded on the disk at the time of manufacture. The MR head is typically part of a read/write head assembly in which the MR element is used for reading user data and servo pattern information from the disk, and another element (typically an inductive element) is used for writing customer data to the disk.

The read/write head assembly is mounted on a disk arm that is moved across the disk by a servo. A disk drive servo control system controls movement of the disk arm across the surface of the disk to move the read/write head assembly from data track to data track and, once over a selected track, to maintain the assembly in a path centered over the selected track. Maintaining the head assembly centered over a track facilitates accurate reading and recording of customer data. With the very high track density of current disk drives, even the smallest head positioning error can potentially cause a loss of customer data.

During data read operations in the data channel, thermal asperities can severely disrupt the stream of readback signal data samples, perhaps causing five to thirty consecutive bytes of readback data pulses to contain errors. Such a large number of consecutive errors may be difficult to correct with conventional error correction codes. Because the data channel readback signal represents customer data stored on the disk, it is imperative to completely recover all of the bytes of data that are present in the readback signal. A disk storage device is unserviceable if customer data is lost or corrupted.

In the servo channel, the readback signal produced when the transducing head is above a servo field of the disk should be approximately the same signal for each servo sector in the same track. Because the readback signal samples from the servo sectors repeat for the same track, it therefore is commonly viewed as less imperative to completely recover all of the servo information from any one servo sector field. That is, in the servo channel, any errors in the readback signal from one of the servo sectors can be replaced by values in the readback signal for the next succeeding servo sector, so each bit in the readback signal is not viewed as critically important.

In addition, a computer data storage system may typically require successfully reading from four to eight successive servo sectors before the system will declare the read/write head to be on-track so as to permit write operations. A disk drive storage system will typically require more than one revolution of the disk following a bad servo read indication for the system to realize and verify that it is actually on-track. It is possible for the successive-read requirement to give a false off-track indication, so that write operations may be inhibited even though the MR head is actually on-track.

Data Channel TA Detection

Be cause of the critical need to recover every data pulse of the data channel signal, it is conventional to include a thermal asperity detector for the data channel. The thermal asperity detector is designed to recognize the characteristic voltage spike and long decay of the thermal asperity in the readback signal. Some relatively sophisticated processing may then be performed to recover from the induced data errors. For example, when a thermal asperity is recognized, some data storage systems adjust voltage gain levels (or keep them constant) so as to minimize the affect of the thermal asperity in the data channel processing, perhaps performing repeated read operations as well. Other data storage systems may recognize thermal asperities that repeatedly occur in the same data sector, which is then labeled as bad. Spare data sectors of the disk drive are then used to replace the data sectors declared to be bad, and customer data is moved to the spare data sector.

Conventional wisdom is that a thermal asperity detector is not needed for the servo channel, because the readback signal from servo sectors should be the same for each sector of a given disk track, and servo sectors are repeated across the surface of the disk. In fact, servo fields are repeated sufficiently (generally, approximately ninety servo sectors per disk revolution) that fully ten percent of the disk surface area is devoted to the servo fields. Thus, typically no special processing is performed in the servo channel for thermal asperities, and digitized samples from a servo sector with a thermal asperity are quickly followed by samples from successive servo sectors that are not likely affected by a thermal asperity. Therefore, corrupted readback signal samples are typically followed by uncorrupted signal samples, which it is believed should minimize the chances of commanding an incorrect head arm movement.

With demand for greater data storage capacity for disk drive systems, there is increasing demand for efficient use of disk drive resources and more precise control of disk arm movement. Accordingly, it would be advantageous if there was a reduction in the uncertainty of disk servo information and an increase in the quality and reliability of such information. For example, it would be advantageous if the disk drive controller did not have to process spurious readback signal data of servo fields if the data comes from disk sectors known to be bad, therefore permitting more processor time for tasks other than servo processing.

From the discussion above, it should be apparent that there is a need for a disk drive storage system that more efficiently utilizes storage system resources and, in particular, handles thermal asperities more efficiently. The present invention solves this need.

SUMMARY OF THE INVENTION

The present invention provides a direct access storage device (DASD) with a disk arm whose movement is controlled in response to a readback signal generated from a magneto-resistive (MR) transducer of the arm, wherein the MR transducer repeatedly passes adjacent multiple servo fields and data fields of the recording medium and receives multiple data samples, detects a thermal asperity in the readback signal when the MR transducer is above a servo field of the recording medium, determines that the servo field data samples affected by the thermal asperity are invalid due to possible data errors, and operates a servo demodulator of the DASD in response to the thermal asperity before the MR transducer is next above the servo field of the recording medium. In a DASD with a rotating disk, for example, the thermal asperity can be detected and the response can be implemented before one revolution of the disk has been completed after the thermal asperity was first encountered. This permits servo data samples that have been corrupted by the thermal asperity to be ignored, thereby removing uncertainty, and improving the quality of the servo information. Other processing operations can be undertaken in response to detection of the thermal asperity. In this way, the DASD more effectively utilizes storage system resources and, in particular, handles thermal asperities more efficiently.

In one aspect of the invention, the thermal asperity response can be implemented after the first servo field having a thermal asperity is encountered, and before another servo field is encountered. In another aspect of the invention, the servo control system can determine the location of data errors in the string of data pulses from the servo field. That is, the invention provides a pointer that permits localization of the servo sample errors as between the gray code and the servo pattern down to the individual bits in the readback signal. Alternatively, a servo sector can be determined to contain permanent thermal asperities, and readback signal samples from that sector can thereafter be ignored. If desired, the number of successful servo samples required for a read or write operation can be reduced.

Other features and advantages of the present invention should be apparent from the following description of the preferred embodiment, which illustrates, by way of example, the principles of the invention.

DESCRIPTION OF THE PREFERRED EMBODIMENTS

Figure 1:
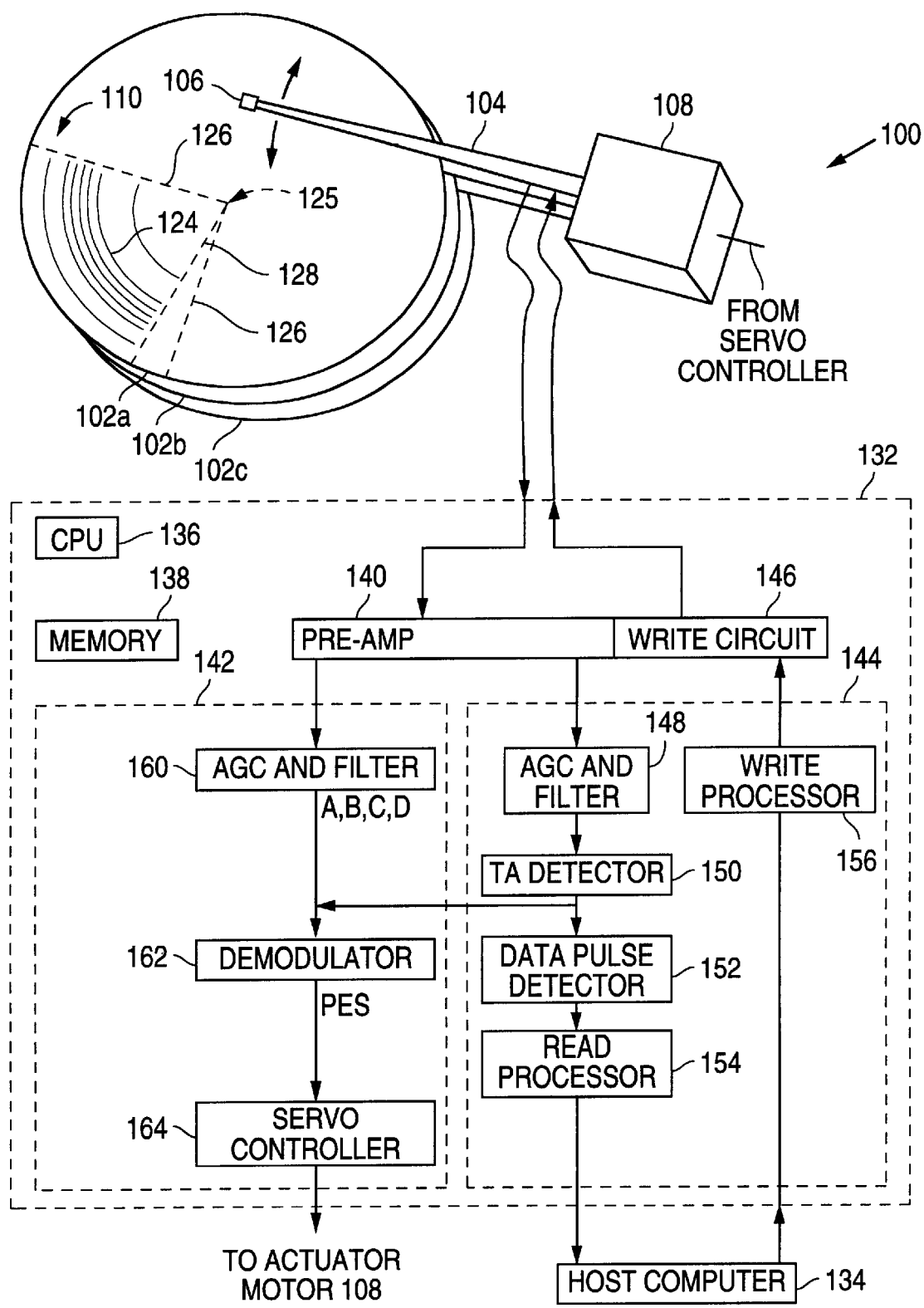
FIG. 1 is a schematic block diagram representation of a disk drive storage system constructed in accordance with the present invention.

FIG. 1 illustrates an exemplary direct access storage device (DASD) 100 comprising a disk drive constructed in accordance with the present invention. The DASD includes multiple disks 102 whose top surfaces 102a, 102b, 102c respectively, are shown, and on which are deposited a magnetic recording medium for storing magnetically encoded information. The bottom surfaces of the disks have a similar construction. Although three disks 102a, 102b, 102c are indicated in FIG. 1, it should be understood that the invention has applicability to disk drive systems with any number of disks consistent with the following description of operation. A reference to a single disk 102 should be understood to have applicability to each of the disks.

Read/write heads 104 mounted on arms 106 are moved across the surface of the disks 102 in response to a readback signal generated from the heads, which are constructed with magneto-resistive (MR) read elements. The MR element of a read/write head repeatedly passes above the surface of multiple servo fields and data fields of the recording medium, generating the readback signal. The readback signal is digitized and multiple data samples are provided to a sector servo control system. If a hard particle on the surface of the disk, such as a dust particle or a disk imperfection, collides with the MR element, a small but sudden increase in temperature of the entire MR head can be produced. The temperature increase, referred to as a thermal asperity, causes a transient but dramatic change in the voltage of the readback signal. In accordance with the invention, a thermal asperity is detected in the readback signal when an MR head is above a first servo field of the recording medium.

A servo controller in accordance with the invention determines that the servo field data samples affected by the thermal asperity are invalid due to possible data errors, and responds to the thermal asperity by adjusting operation of a servo demodulator before the MR head is next above the asperity-containing servo field. In a DASD with a rotating disk, for example, the thermal asperity response can be implemented before one revolution of the disk has been completed after the thermal asperity was first encountered. This permits data samples that have been corrupted by the thermal asperity to be ignored from servo processing, thereby improving the quality of the processed servo information. If desired, other processing operations can be undertaken in response to detection of the thermal asperity. In this way, the DASD more effectively utilizes storage system resources and, in particular, handles thermal asperities more efficiently.

The exemplary disk drive DASD system 100 shown in FIG. 1 is a sector servo system having three disks arranged in a coaxial fashion. Each disk has a top surface and a bottom surface, and so the three-disk system has six surfaces on which information can be recorded. Each disk surface is provided with an MR read/write head 106 for transducing recorded information from the disk surfaces and for recording information onto the disk surfaces. An actuator motor 108 pivots all of the actuator arms 104 simultaneously, thereby changing the position of all the read/write heads 106 across the disks 102. The actuator motor is typically constructed as a voice coil motor (VCM).

A portion of the first disk 102a is shown in FIG. 1 having concentric tracks 110 of information. Movement of the disk arms 104 is indicated by the arrows extending across the disk. Although rotary movement of the arms 104 is depicted for illustrative purposes, the disk drive system 100 may alternatively use another positioning scheme, such as linear extension/retraction of the arms. In FIG. 1, parallel circular lines 124 represent tracks of the disk, and dashed radial lines 126 represent sector-defining lines. A sector 125 extends from one dashed line 126 to the next line 126. Each sector includes a servo field and a user data field. A sector servo information field is defined as the area of a sector 125 between a sector line 126 and a delimiting line 128 located toward one radial edge of the sector. In alternative embodiments, the dashed radial lines 126 and 128 may be curved.

Figure 2:
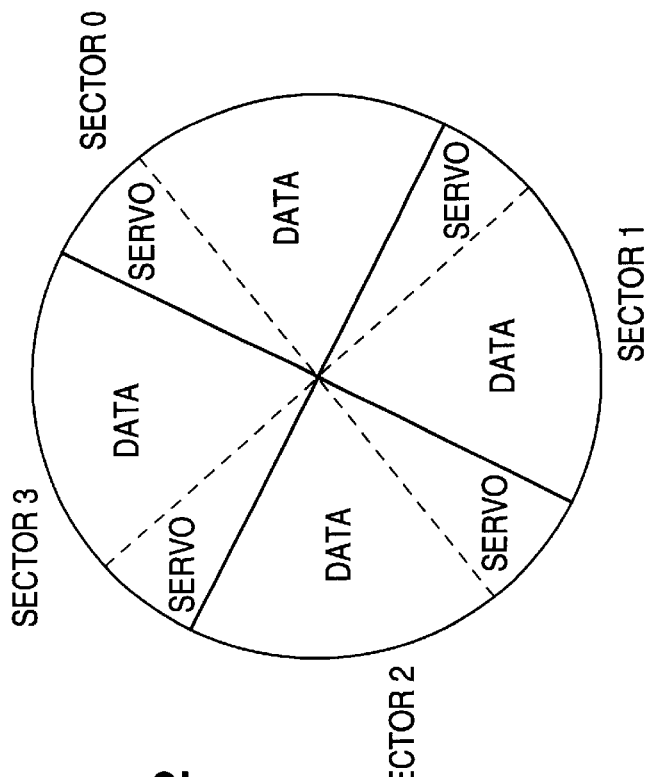
FIG. 2 is a representation of a disk surface of the storage system illustrated in FIG. 1.

FIG. 2 illustrates an exemplary disk arrangement in which four sectors per disk are shown. That is, the four sectors on any one disk are of equal size and are labeled Sector 0, Sector 1, Sector 2, and Sector 3. Solid radial lines indicate the boundaries of the respective sectors, with dashed lines to separate servo fields from customer data fields. It should be understood that the sectors and fields are not defined by actual recorded radial lines on the respective disk surfaces, rather, the radial lines are a convenient fiction for purposes of illustration. The arrangement of sectors in the DASD 100 is the same for all the surfaces of all the disks. A different number of sectors and cells from that shown may be provided.

Servo track information is recorded in the servo information area, and customer data is recorded in the disk data area corresponding to the remainder of the sector. The servo track information typically includes a sector marker, track identification data, and a servo burst pattern. The sector marker indicates to the read/write head that servo information follows immediately in the track. The remaining area of a sector contains customer data.

Disk Drive Controller

The operation of the DASD disk drive 100 is managed by a disk drive controller 132, which also serves as an interface between the disk drive and a host computer 134. The host computer may comprise, for example, a desktop computer, a laptop computer, a mainframe computer, or any other digital processing device for which storage of data on a disk is desired. The disk drive controller 132 includes a central processor unit (CPU) 136 that executes program instructions stored in controller memory 138 to implement the desired operation, as described below.

In the preferred embodiment of FIG. 1, the disk drive controller 132 includes a readback signal pre-amplifier circuit 140 ("pre-amp"), which receives electrical representations of the data recorded on the disk surface as sensed by the MR read/write heads 106. The readback pre-amp 140 serves a dual purpose by amplifying either data signals or servo signals, depending on whether the associated read/write head 106 is positioned over stored customer data or over servo pattern data, respectively. Thus, the amplified signal from the pre-amp 140 is directed to two processing channels: a servo channel 142 and a customer data channel 144. A write circuit 146 is provided to supply the read/write head 106 with customer data signals from the data channel 144 for recording onto the disks 102.

The data channel 144 generally writes and reads data to and from a disk 102 in response to requests from the host computer 134 to read or write the customer data. The write circuit 146 is connected only to the customer data channel 144. In the data channel, the pre-amp 140 amplifies the readback signal from the MR head 106 and directs the readback signal to an automatic gain control and filter circuit 148. Next, a thermal asperity (TA) detector 150 receives the analog signal from the AGC circuit 148 and recognizes a waveform that indicates a thermal asperity. A thermal asperity can be detected well before the next servo sector is encountered and, in conjunction with conventional error correction codes (ECC), the bit location of corrupted data can be identified.

If a thermal asperity is recognized, the TA detector processes the readback signal to reduce the effects of the asperity and preferably produces information that indicates to the disk drive controller CPU 136 that a thermal asperity has been encountered. The output from the TA detector 150 is next provided to a data pulse detector 152 that forms digital pulses corresponding to the analog readback signals. Next, a pre-host read processor 154 converts the data pulses into formatted data strings that are compatible with the host computer 134. For write operations, data is received from the host computer and is provided to a write processor 156, which formats the data and delivers it to the write circuit 146 for recording onto the disk surface.

Figure 3:
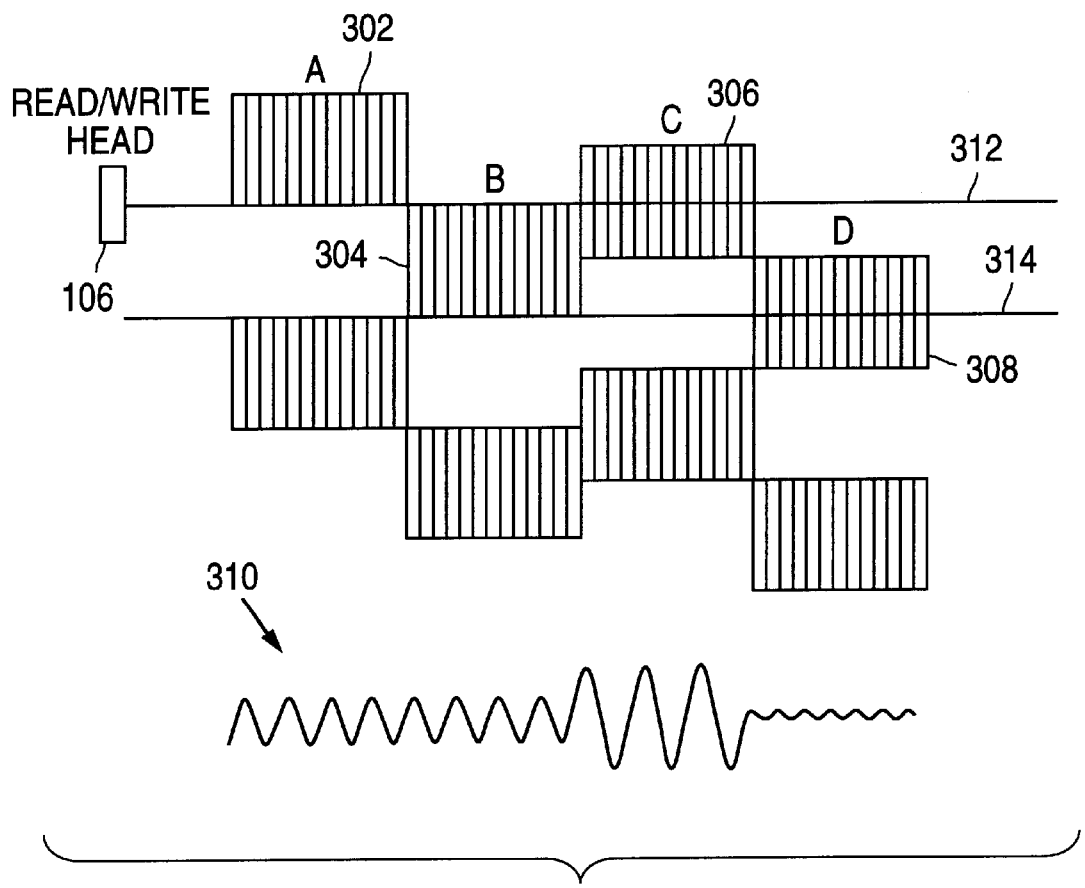
FIG. 3 is an illustration of the analog readback signal generated by the MR head shown in FIG. 1 when transducing a servo pattern.

The servo channel 142 generally reads servo data from the disk 102 to aid in properly positioning the read/write head 106. When operating in conjunction with the servo channel 142, the pre-amp 140 amplifies servo signals produced when the read/write head 106 transduces servo patterns. FIG. 3 shows a typical quadrature servo pattern having A, B, C, D servo bursts 302, 304, 306, 308, which will be familiar to those skilled in the art. FIG. 3 also shows an amplitude-type servo readback signal 310 that is generated when the MR head 106 is positioned above a first track 312. A second track 314 is indicated in the drawing. Each servo burst 302-308 is sensed and processed to provide servo signals that guide the read/write head 106 along one of the tracks 312, 314. Those skilled in the art will recognize that the FIG. 3 servo bursts 302, 304, 306, 308 form a quadrature pattern, the bursts being commonly referred to by the designations A, B, C, and D, respectively.

Although the A and B bursts 302, 304 most directly serve to guide the read/write head 106 in following the track 312, these two bursts also provide position information that is useful in guiding the head 106 along more remote tracks, such as the track 314. The illustrated servo pattern is referred to as an amplitude-type pattern because the amplitude of the readback signal is greatest when the head 106 is centered over one of the servo bursts, and decreases in amplitude as the head is moved away from the longitudinal center of a burst. Thus, because the head 106 is shown in FIG. 3 tracking a path centered over the C burst along the track 312, the portion of the readback signal 310 with the greatest amplitude is generated when the head is over the servo burst C.

Returning to FIG. 1, the servo channel 142 includes an automatic gain control (AGC) and filter circuit 160, which may comprise any one of various known circuits for automatically adjusting the readback signal gain and filtering it. The output of the AGC and filter circuit comprises processed analog A, B, C, D servo data. The AGC function of the circuit 160 is typically performed by a variable gain amplifier and gain control circuitry. Such gain control is intended to automatically adjust for relatively slow amplitude variations in the readback signal. These variations are usually caused by changes in the MR head-to-disk spacing, drift in the MR head bias current, drift in the gain from the pre-amp 140, and the like.

Next, a demodulator/decoder 162 receives the processed readback signal, derives digitized A, B, C, D burst values, and produces P and Q quadrature data. The demodulator also generates a position error sensing (PES) signal that indicates the position of the MR head 106 relative to a track center of the disk 102. Those skilled in the art will understand how to derive the P and Q data and how to generate the PES signal, from the digitized readback signal samples, without further explanation. The PES signal is then provided to a servo controller 164, which uses the PES data to generate a control signal that is provided to the actuator motor 108 and thereby controls the position of the MR head 106.

In accordance with the invention, the demodulator 162 also receives the output signal from the TA detector 150 of the data channel 144. Unlike typical disk drive controllers, the controller 132 of the preferred embodiment alters processing in the servo channel 142 in response to a detected thermal asperity in the servo readback signal. More particularly, the AGC and filter 148 of the data channel 144 receives the MR head readback signal, and the AGC and filter 160 of the servo channel 142 also receives the MR head readback signal. The data channel 144 includes a conventional TA detector 150 because of the critical nature of recovering every bit of customer data, and in the disk drive controller 132 of the invention, the TA detector output also is used in the servo channel 142. It should be understood that the data pulse detector 152 and the read processor 154 of the data channel 144 do not process the readback signal when the head 106 is over a servo field, even though the TA detector 150 processes the readback signal when the head is over a servo field.

Figure 4:
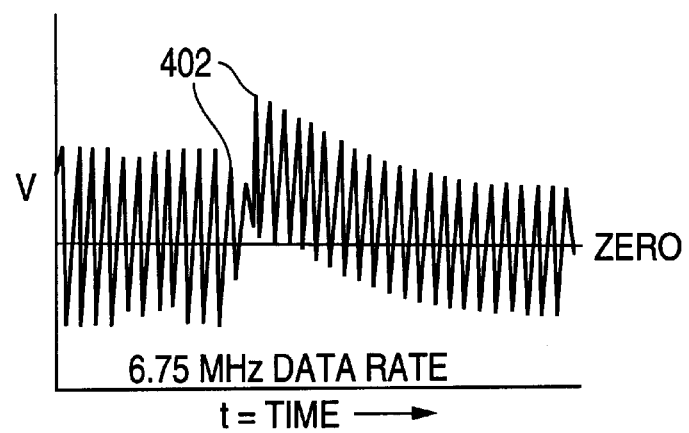
FIG. 4 is a detail representation of the analog readback signal, illustrating a thermal asperity when transducing a servo pattern.

FIG. 4 shows a typical analog readback signal about a zero-baseline with indicated signal transients 402 as affected by a thermal asperity. The TA detector 150 can be any conventional circuit that recognizes such signal waveforms as a thermal asperity. As is conventional, the TA detector may provide a flag that indicates the presence of a thermal asperity when set, and optionally may include error correction code that can pinpoint where in a string of data samples an error most likely occurred. In the latter case, the TA detector output functions as a thermal asperity error pointer.

When the servo demodulator 162 receives an indication from the TA detector 150 that a thermal asperity has been recognized in the readback signal, different processing from the ordinary takes place. Depending on the thermal asperity processing employed, the thermal asperity detection also may be communicated to the disk drive controller CPU 136 and/or the servo controller 164, either by the TA detector 150 or the demodulator 162.

As noted above, conventional servo channels do not even recognize the presence of a thermal asperity, and typically process all servo signal samples in the same manner, whether or not they are affected by a thermal asperity. Among disk drives that can recognize errors in the servo signal samples, generally without regard to the source of the errors, the most typical out-of-ordinary processing is to ignore the affected servo signal samples.

In accordance with the present invention, the disk drive controller 132 recognizes that the servo signal samples have been compromised by a thermal asperity, which means that the controller knows the character of the error. That is, the amplitude of the readback signal is likely many times that of an unaffected readback signal value (see FIG. 4), and therefore the most appropriate response is known. In particular, the preferred embodiment maintains the gain settings of circuit elements in the servo channel to minimize the affects of the thermal asperity on the servo signal samples. Those skilled in the art will understand the nature of corrective processing employed to minimize the affects of thermal asperities on the readback signal, and it is contemplated that a wide variety of conventional signal processing operations may be applied to the TA-affected servo readback signal.

Figure 5:
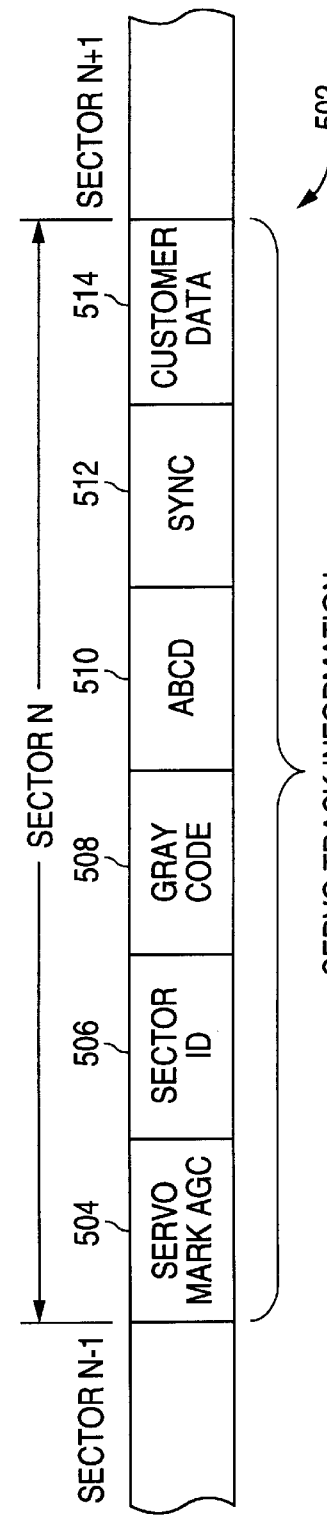
FIG. 5 is a representation of the information contained in a servo field of the disk drive storage system illustrated in FIG. 1.

One of the processing operations that may be employed by the demodulator 162 is to receive thermal asperity information that points to the location of the most likely errors in the servo information. FIG. 5 shows a portion of a track 502 from one of the disks 102, showing a servo track information area and the customer data area that follows. The servo track information area includes a servo mark field 504 that indicates servo information follows in the track, and also serves an automatic gain control (AGC) function. The servo mark is followed by a sector identification field 506, and then a gray code field 508 that provides track number information. Next, a servo pattern field 510 contains a servo burst pattern. A synchronization field 512 then immediately precedes a customer data field 514, where disk users read and write their data.

In the FIG. 5 illustration, the servo burst pattern 510 is indicated as a quadrature pattern having four servo bursts labeled A, B, C, and D. Those skilled in the art will understand that the servo bursts will, when decoded, produce the PES signal described above. After a seek operation to move the read/write head to a desired track, a conventional digital servo control system generates a write inhibit signal that will prevent any data recording if the read/write head is not at the proper track and if it is away from the track centerline by more than a threshold limit. The servo control system typically achieves the write inhibit by shutting off the write gate of a write control processor, thereby preventing off-track write operations.

In accordance with the present invention, the servo demodulator 162 (FIG. 1) receives thermal asperity information from the TA detector 150 that points to the most likely location of the errors in the servo track information. For example, using known error correction code (ECC) techniques, it is possible to receive thermal asperity pointer information that can point to the exact bits in the gray code field 508 that most likely have been affected by the thermal asperity. It may then be possible for the demodulator to estimate the most likely correct value of the gray code. Alternatively, the demodulator 162 may learn the exact location in the bits of the sector ID 506 or the servo pattern 510 where an error occurs, and take appropriate action. Typically, ECC techniques permit identification of erroneous bits and also correction of those bits. This processing may be performed by the controller CPU 136 or demodulator 162.

Processing Steps of the Controller

Figure 6:
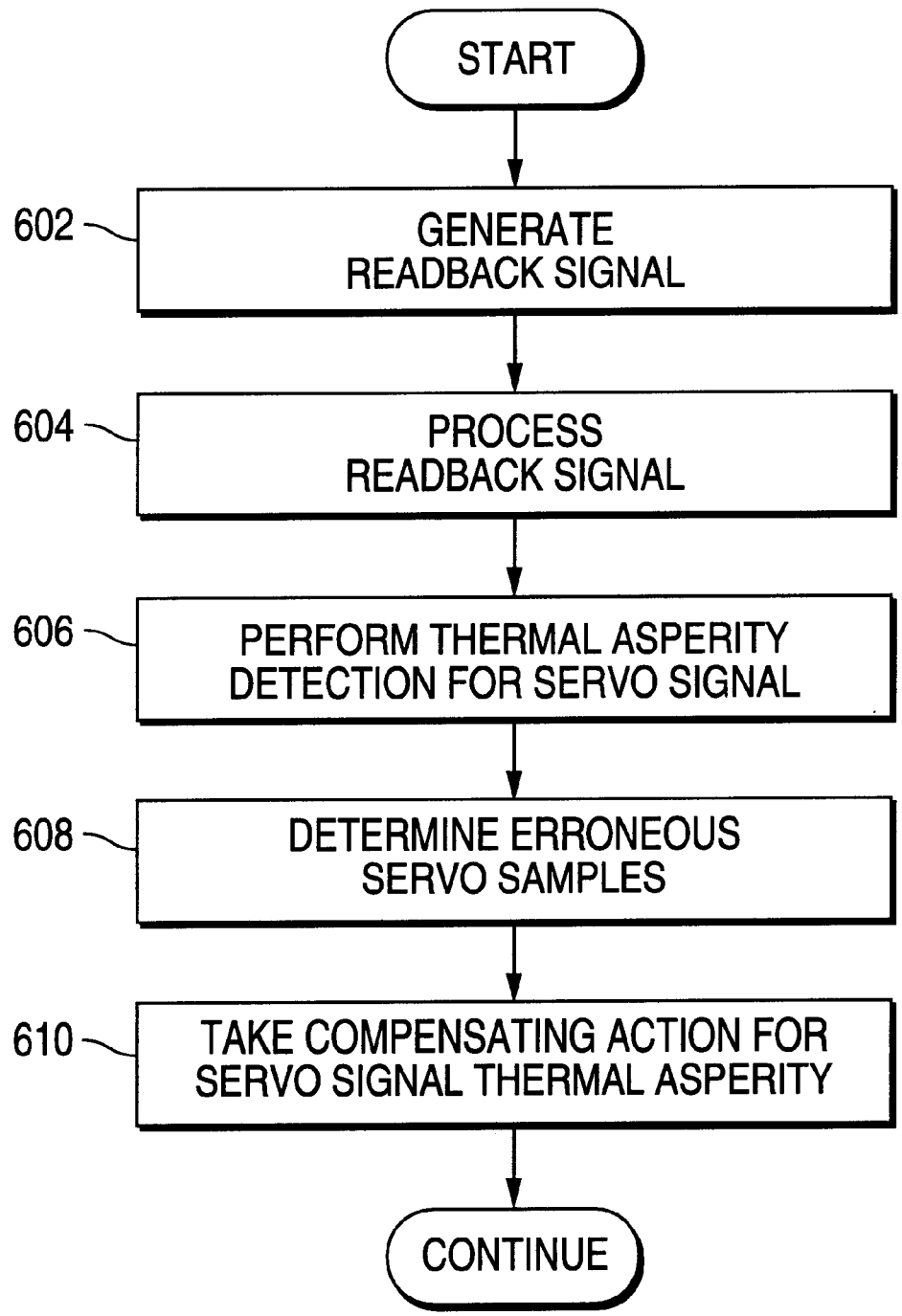
FIG. 6 is a flow diagram of the processing steps performed by the disk drive controller illustrated in FIG. 1.

FIG. 6 shows the disk drive controller processing steps performed by the DASD controller 132. The first processing step, represented by the FIG. 6 flow diagram box numbered 602, is to transduce the recorded magnetic information and generate a readback signal having multiple data samples as the MR heads repeatedly pass multiple servo fields and data fields in a track of the recording medium. The next step, represented by the flow diagram box numbered 604, is to process the readback signal with automatic gain control and amplification circuitry. This includes processing the readback signal in the servo channel when the MR head is above a servo field of the recording medium, and processing the readback signal in the data channel when the MR head is above a customer data field.

The disk drive controller next detects and indicates a thermal asperity in the readback signal when the MR transducer is adjacent a first servo field. This processing step is represented by the flow diagram box numbered 606. As noted above, this processing step is particularly performed by the TA detector. Next, the disk controller determines that the servo field data samples transduced from the first servo field are invalid due to the indicated thermal asperity, as represented by the flow diagram box numbered 608. Finally, the disk drive controller responds to the thermal asperity by taking compensating action before the MR head is next adjacent the first servo field. This processing step is represented by the flow diagram box numbered 610.

As noted above, the compensating action (box 610) taken in response to the thermal asperity in the servo signal can comprise many different operations. One action may be to maintain the amplifier gain settings of the servo channel AGC 160 or within the servo demodulator 162. Another action may be to reduce the number of good sector reads required for an on-track determination. For example, many systems require eight successive good sector reads. The compensating action (box 610) may comprise detecting that one of the eight sectors contains a thermal asperity, and therefore only requiring seven consecutive good sector reads.

Another compensating action (box 610) may be simply to determine that the servo field contains a permanent thermal asperity and to thereafter ignore data samples of the readback signal from that servo field. The demodulator may take this action, for example, if it stores within its memory space or in the DASD memory 138 an indication of which sectors were most recently indicated as having a thermal asperity. If the demodulator checks each new indication of a current thermal asperity against a "most recent asperity" list, and if the demodulator discovers that the same sector has had consecutive asperities above a threshold number of asperities, then the demodulator may set a flag to ignore servo samples from the affected sector. Such action 610 can advantageously reduce the processing that otherwise would have to be done by the demodulator, because then known spurious or erroneous servo samples would not be processed. In this way, the quality of the servo information being processed is improved.

Alternatively, the compensating action (box 610) may involve the demodulator responding to the thermal asperity by determining that gray code samples of the readback signal contains data errors, and by using gray code samples from a prior servo sector that has no data errors. As above, the demodulator may take this action if it stores within its memory space or in the DASD memory 138 an indication of which sectors contain valid gray code data, or if it stores gray code data for a known valid sector servo field. If a thermal asperity is indicated, and if the error pointer indicates that gray code data has been compromised, then the demodulator can simply recall valid gray code data for the track and use it in place of the known affected gray code data.

Another advantage of the DASD 100 that may be gained by servo signal thermal asperity processing 610 is that the detected thermal asperity from the first servo field may be responded to before the MR head is above a second servo field of the track. That is, the response time of the system is very quick. If desired, the DASD may respond to a sector containing a thermal asperity before the MR head is above the next succeeding servo sector.

Alternative Embodiment

Figure 7:
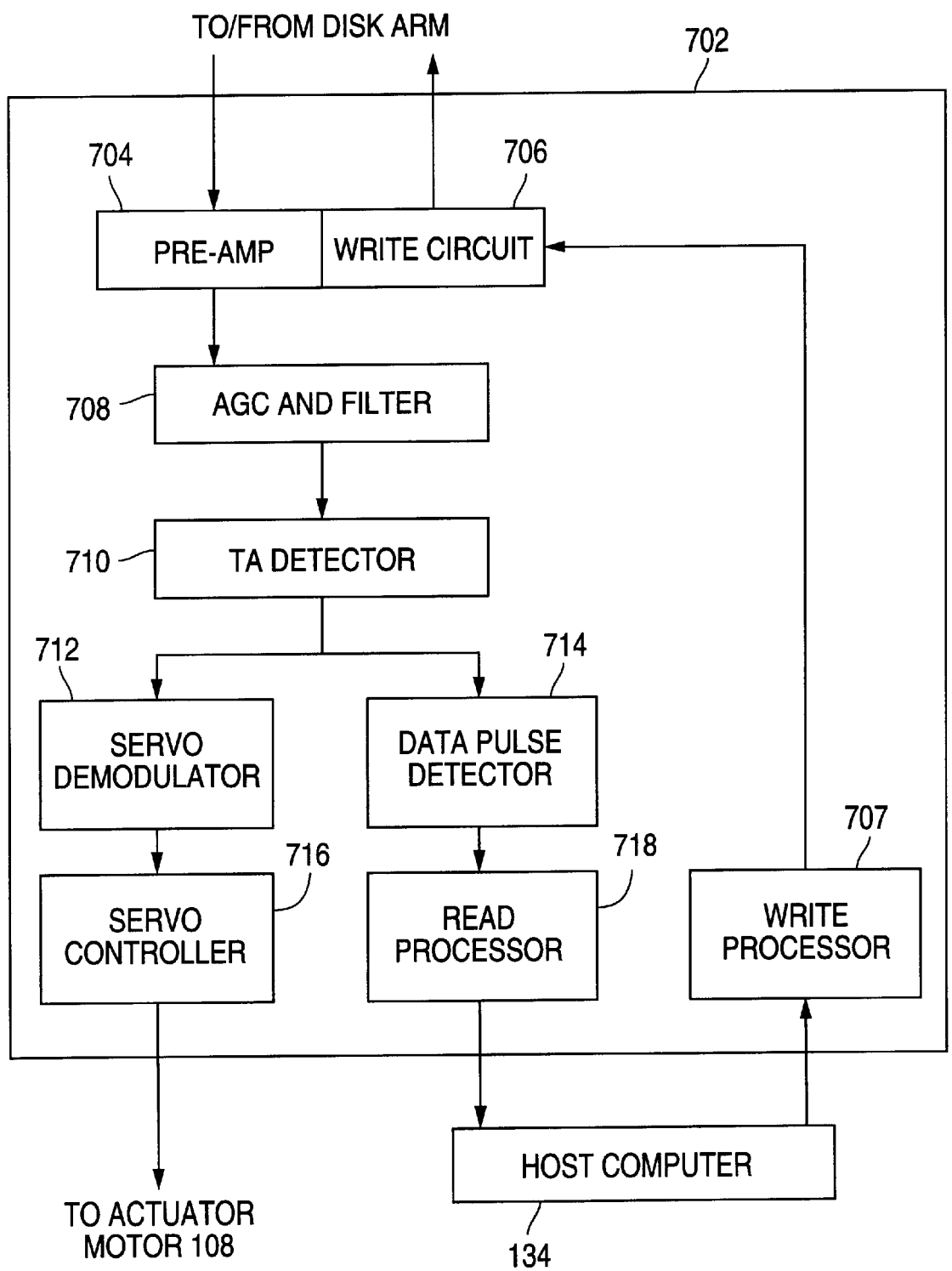
FIG. 7 is a block diagram of an alternative embodiment of a disk drive controller constructed in accordance with the present invention.

FIG. 7 shows an alternative embodiment of a disk controller 702 constructed in accordance with the present invention. The alternative controller 702 provides an integrated data channel and servo channel, and can be provided in place of the embodiment 132 shown in FIG. 1.

The FIG. 7 controller 702 again provides an interface to a host computer 134, and communicates with the disk arms 104 and heads 106. Within the controller 702, the readback signal is received at a pre-amp circuit 704 and formatted write data is received at a write circuit 706 after processing by a write processor 707. For the readback signal, after amplification by the pre-amp 704, the readback signal is delivered to a single AGC and filter block 708, rather than the dual data-servo AGC configuration of the FIG. 1 embodiment.

After processing by the AGC and filter 708, the analog readback signal is provided to a TA detector 710. The TA detector detects thermal asperities in the readback signal and provides an indication as its output, as is conventional. In the FIG. 7 embodiment, the output of the TA detector is provided simultaneously to a servo demodulator 712 and to a data pulse detector 714. Although there are no separate hardware channels in the FIG. 7 embodiment, the demodulator 712 performs processing traditionally performed in the servo channel, and the pulse detector 714 performs processing traditionally performed in the data channel.

After the servo demodulator derives digital servo pattern data and the PES signal, the output is provided to the servo controller 716, which generates a signal to the actuator motor 108 to control positioning of the arms 104 across the disks 102 (see FIG. 1). After the data pulse detector 714, the output is provided to the read processor 718, which decodes the data read from the disk and provides it to the host computer 134. In either of the two embodiments described above, FIG. 1 and FIG. 7, the disk drive storage system recognizes thermal asperities and takes compensating action in the servo demodulation processing, thereby improving the accuracy of the servo information being processed and more effectively utilizing storage system resources.

Advantages of the Invention

In both of the embodiments described above, the present invention controls disk arm movement by detecting thermal asperities in the servo readback signal, determining that the servo samples affected by the thermal asperities are invalid due to possible data errors, and operating a servo demodulator in response to the servo thermal asperity before the MR head is next above the servo field. This permits data samples that have been corrupted by the thermal asperity to be ignored from servo processing, reducing the uncertainty in the servo information processed by the demodulator. The response to a servo sector containing a thermal asperity can be implemented before the next servo sector is encountered.

The present invention has been described above in terms of presently preferred embodiments so that an understanding of the present invention can be conveyed. There are, however, many configurations for disk drive control systems not specifically described herein but with which the present invention is applicable. The present invention should therefore not be seen as limited to the particular embodiments described herein, but rather, it should be understood that the present invention has wide applicability with respect to disk drive control systems generally. All modifications, variations, or equivalent arrangements and implementations that are within the scope of the attached claims should therefore be considered within the scope of the invention.

I claim:

1. A method for controlling movement of an arm adjacent a magnetic recording medium in a direct access storage device (DASD) in response to a readback signal generated from a magnetoresistive (MR)transducer of the DASD arm, the method comprising the steps of
   (a) receiving multiple data samples of the readback signal as the MR transducer repeatedly passes above multiple servo fields and data fields of the recording medium;
   (b) detecting a thermal asperity in the readback signal when the MR transducer is above a servo field of the recording medium;
   (c) determining the location of the servo field data samples affected by the thermal asperity; and
   (d) altering processing in the servo channel in response to determining the location of the servo field data samples affected by the thermal asperity, before the MR transducer is next above the servo field of the recording medium.

2. A method as defined in claim 1, wherein the step of operating a servo demodulator comprises responding to the thermal asperity from the servo field before the MR transducer is above another servo field of the recording medium.

3. A method as defined in claim 2, wherein said another servo field of the recording medium comprises the next servo field after the servo field containing the thermal asperity.

4. A method as defined in claim 1, further comprising the steps of:
   (c) determining that gray code samples of the readback signal contains data errors; and
   (d) using gray code samples from a prior servo sector that has no data errors.

5. A method as defined in claim 1, wherein the step of operating the servo demodulator comprises maintaining amplifier gain settings of a servo demodulator amplifier.

6. A method as defined in claim 1, further including the step of:
   (e) determining that a servo sector of the recording medium contains a permanent thermal asperity and ignoring data samples of the readback signal from that servo sector.

7. A method as defined in claim 1, wherein the recording medium comprises a disk that rotates relative to the MR transducer and contains multiple servo sectors, and the step of operating a servo demodulator comprises responding to the thermal asperity before the disk completes one revolution after the thermal asperity has been detected in a servo sector.

8. A method as defined in claim 7, wherein the thermal asperity response occurs before the MR transducer is moved to the next following servo sector.

9. A method of controlling operation of a direct access storage device in which write operations record magnetic information on a recording medium between servo pattern sectors of the recording medium, the method comprising the steps of:
   (a) transducing recorded magnetic information and generating a readback signal having multiple data samples as a magnetoresistive (MR) transducer repeatedly passes multiple servo fields and data fields in a track of the recording medium;
   (b) processing the readback signal generated when the MR transducer is above a data field of the recording medium in a data channel of the direct access storage device;
   (c) processing the readback signal generated when the MR transducer is above a servo field of the recording medium in a servo channel of the direct access storage device;
   (d) detecting a thermal asperity in the readback signal when the MR transducer is above a servo field of the track;
   (e) determining the location of the servo field data samples that are invalid due to the asperity; and
   (f) altering processing in the servo channel in response to determining the location of the servo field data samples that are invalid before the MR transducer is next above the servo field containing the thermal asperity.

10. A method as defined in claim 9, wherein the step (f) of responding comprises maintaining amplifier gain settings of a servo demodulator amplifier.

11. A method as defined in claim 10, further including the step of:

(g) determining that a servo field of the recording medium contains a permanent thermal asperity and ignoring data samples of the readback signal from that servo field.

12. A method as defined in claim 10, wherein the step (f) of responding comprises responding to the detected thermal asperity from the servo field before the MR transducer is above another servo field of the track.

13. A method as defined in claim 12, wherein the thermal asperity response occurs before the MR transducer is moved to a servo sector immediately following the servo sector in which the thermal asperity was detected.

14. A data storage system comprising:

a magnetic recording medium;

a magneto-resistive (MR) transducer mounted on a moveable arm and generating a readback signal as the MR transducer is passed above the recording medium and transduces servo information fields and customer data fields recorded thereon;

a thermal asperity detector that detects a thermal asperity in the readback signal when the MR transducer is above a servo field of the recording medium; and a disk controller that receives servo field data samples front the MR transducer, and that receives an indication that the thermal asperity detector has detected the location of data errors due to a thermal asperity; and altering processing in the servo channel in response to detecting the location of data errors due to a thermal asperity before the MR transducer is next above the servo field containing the thermal asperity.

15. A data storage system as defined in claim 14, wherein the disk controller responds to the thermal asperity from the servo field before the MR transducer is above another servo field of the recording medium.

16. A data storage system as defined in claim 14, wherein the disk controller further determines that gray code samples of the readback signal contain data error and uses gray code samples from a prior servo sector that has no data errors.

17. A data storage system as defined in claim 14, wherein the disk controller responds to the thermal asperity by maintaining amplifier gain settings of a servo demodulator amplifier.

18. A data storage system as defined in claim 14, wherein the disk controller determines that a servo sector of the recording medium contains a permanent thermal asperity and ignores data samples of the readback signal from that servo sector.

19. A data storage system as defined in claim 14, wherein the recording medium comprises a disk that rotates relative to the MR transducer, and the disk controller responds to the thermal asperity before the disk completes one revolution after the thermal asperity has been detected.

20. A storage device controller comprising:

amplification circuitry that receives an analog readback signal generated by a magneto-resistive (MR) transducer mounted on a movable arm that is passed above a recording medium and transduces servo information fields and customer data fields recorded thereon;

a thermal asperity detector that detects a thermal asperity in the readback signal when the MR transducer is above a servo field of the recording medium; and a demodulator that received servo information field data samples, and that receives an indication that the thermal asperity detector has detected a thermal asperity, and determines that the servo field data samples affected by the thermal asperity are invalid due to possible data errors, wherein the disk controller responds to the indicated thermal asperity by altering processing in the servo channel in response to detecting a thermal asperity in the readback signal before the MR transducer is above the next servo field of the recording medium.

21. A storage device controller as defined in claim 20, wherein the demodulator determines the location of the data errors in the servo field data samples.

22. A storage device controller as defined in claim 21, wherein the demodulator further determines that gray code samples of the readback signal contain data errors and uses gray code samples from a prior servo sector that has no data errors.

23. A storage device controller as defined in claim 20, wherein the demodulator responds to the thermal asperity by maintaining amplifier gain settings of a servo demodulator amplifier.

24. A storage device controller as defined in claim 20, wherein the demodulator determines that a servo sector of the recording medium contains a permanent thermal asperity and ignores data samples of the readback signal from that servo sector.

25. A storage device controller as defined in claim 20, wherein the recording medium comprises a disk that rotates relative to the MR transducer and contains multiple servo sectors, and the demodulator responds to the thermal asperity before the disk completes one revolution after the thermal asperity has been detected in a servo sector.

26. A storage device controller as defined in claim 25, wherein the thermal asperity response occurs before the MR transducer is moved to the next following servo sector.

* * * * *

UNITED STATES PATENT AND TRADEMARK OFFICE
CERTIFICATE OF CORRECTION

PATENT NO. : 6,335,840 B1  
DATED : January 1, 2002  
INVENTOR(S) : Daniel James Malone Page 1 of 1

It is certified that error appears in the above-identified patent and that said Letters Patent is hereby corrected as shown below:

<u>Column 3,</u>  
Line 8, in place of the first words, insert -- Because --

<u>Column 13</u>  
Line 32, in place of the word "front" insert -- from --

Signed and Sealed this

Nineteenth Day of March, 2002

Attest:

Attesting Officer

JAMES E. ROGAN  
Director of the United States Patent and Trademark Office